(12) United States Patent
Wuidart et al.

(10) Patent No.: US 11,082,092 B2
(45) Date of Patent: Aug. 3, 2021

(54) MEMORY ARCHITECTURE OF A NEAR-FIELD COMMUNICATION DEVICE

(71) Applicants: STMicroelectronics (Rousset) SAS, Rousset (FR); STMicroelectronics (Grenoble 2) SAS, Grenoble (FR)

(72) Inventors: Sylvie Wuidart, Pourrieres (FR); Sophie Maurice, Meylan (FR)

(73) Assignees: STMicroelectronics (Rousset) SAS, Rousset (FR); STMicroelectronics (Grenoble 2) SAS, Grenoble (FR)

( * ) Notice: Subject to any disclaimer, the term of this patent is extended or adjusted under 35 U.S.C. 154(b) by 0 days.

(21) Appl. No.: 16/260,945

(22) Filed: Jan. 29, 2019

(65) Prior Publication Data

US 2019/0245584 A1    Aug. 8, 2019

(30) Foreign Application Priority Data

Feb. 2, 2018    (FR) ...................... 1850888

(51) Int. Cl.
| | |
|---|---|
| H04B 5/00 | (2006.01) |
| G06F 21/60 | (2013.01) |
| H04W 88/18 | (2009.01) |
| H04W 4/80 | (2018.01) |
| H04W 88/02 | (2009.01) |
| G06K 7/10 | (2006.01) |

(52) U.S. Cl.
CPC ......... *H04B 5/0031* (2013.01); *G06F 21/606* (2013.01); *H04W 88/184* (2013.01); *G06K 7/10237* (2013.01); *H04W 4/80* (2018.02); *H04W 88/02* (2013.01)

(58) Field of Classification Search
None
See application file for complete search history.

(56) References Cited

U.S. PATENT DOCUMENTS

| | | | |
|---|---|---|---|
| 7,026,962 B1 | 4/2006 | Emami et al. | |
| 7,274,305 B1* | 9/2007 | Luttrell | ..................... B61L 1/20 |
| | | | 324/141 |
| 2004/0257203 A1 | 12/2004 | Maltsev et al. | |
| 2010/0131078 A1 | 5/2010 | Brown et al. | |
| 2013/0165041 A1* | 6/2013 | Bukovjan | .......... G06Q 30/0242 |
| | | | 455/41.1 |
| 2017/0061784 A1 | 3/2017 | Clough | |

FOREIGN PATENT DOCUMENTS

| | | |
|---|---|---|
| CN | 1588374 A | 3/2005 |
| CN | 101233476 A | 7/2008 |
| CN | 104915696 A | 9/2015 |
| CN | 104915696 B | 10/2017 |
| EP | 2890172 A1 | 7/2015 |

OTHER PUBLICATIONS

INPI Search Report and Written Opinion for FR 1850888 dated May 14, 2018 (8 pages).
First Office Action and Search Report for co-pending CN Appl. No. 201910058393.4 dated Jan. 22, 2021 (8 pages).

* cited by examiner

*Primary Examiner* — Gary Lafontant
(74) *Attorney, Agent, or Firm* — Crowe & Dunlevy

(57) ABSTRACT

A near-field communication device operates to transmit data by near-field communications techniques to another device. The near-field communication device includes a memory that stores a message to be transmitted in an ASCII format. The message is retrieved from the memory and transmitted using the near-field communications techniques in an ASCII format.

14 Claims, 2 Drawing Sheets

MEMORY ARCHITECTURE OF A NEAR-FIELD COMMUNICATION DEVICE

PRIORITY CLAIM

This application claims the priority benefit of French Application for Patent No. 1850888, filed on Feb. 2, 2018, the content of which is hereby incorporated by reference in its entirety to the maximum extent allowable by law.

TECHNICAL FIELD

The present disclosure concerns near-field communication devices and more particularly the storage of a message to be transmitted in a memory of such a device.

BACKGROUND

Cell phones and other types of mobile devices are generally equipped with near-field communication (NFC) interfaces which enable them to execute electromagnetic transponder functions in addition to their other functions. Such devices are particularly capable of emulating the functions of an electromagnetic transponder, be it of contactless card type (so called "card" mode) or of contactless reader type (so-called "reader" mode). Such functionalities increase the possibilities of the mobile device by enabling it to be used for various applications, for example, as an electronic purse enabling it to perform payments, to access services such as transport networks, etc.

SUMMARY

In an embodiment, a near-field communication device comprises a memory storing, in an ASCII format, a message that is near-field transmitted in that ASCII format.

According to an embodiment, the message comprises a static portion and a dynamic portion.

According to an embodiment, the dynamic portion is in a restricted access area of the memory.

According to an embodiment, the static portion is in a free access area of the memory.

According to an embodiment, the static portion comprises the address of a website.

According to an embodiment, the dynamic portion comprises data supplied by a counter.

According to an embodiment, the dynamic portion comprises data supplied by a logic circuit.

According to an embodiment, the memory comprises a first portion storing in ASCII the variable portion of said message to be transmitted, the first portion representing less than 10% of the memory size.

According to an embodiment, the memory comprises a second portion storing data coded in hexadecimal language.

BRIEF DESCRIPTION OF THE DRAWINGS

The foregoing and other features and advantages will be discussed in detail in the following non-limiting description of specific embodiments in connection with the accompanying drawings, wherein.

DETAILED DESCRIPTION

Figure 1:
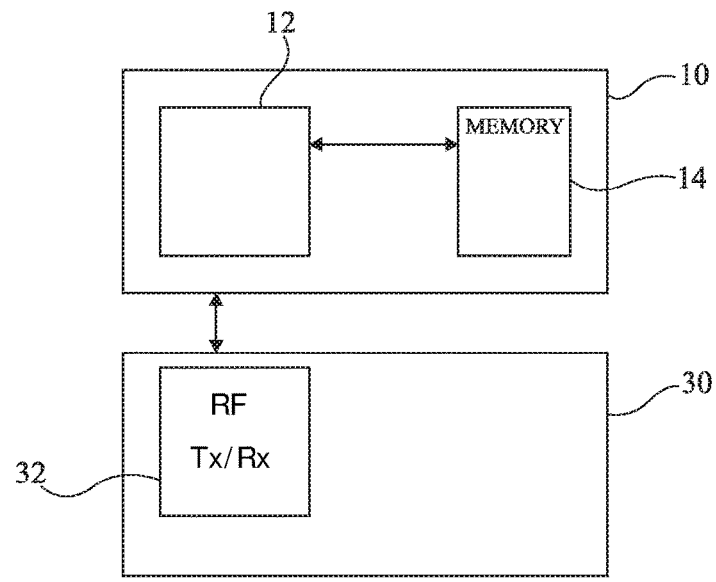
FIG. 1 schematically shows in the form of blocks a communication between two near-field communication devices.

The same elements have been designated with the same reference numerals in the different drawings. For clarity, only those steps and elements which are useful to the understanding of the described embodiments have been shown and are detailed. In particular, the near-field communication devices comprise components, not shown, for example memories or transmit/receive circuits enabling a same device to act in card mode or in reader mode according to the situation.

FIG. 1 schematically illustrates in the form of blocks an example of communication between two near-field communication electronic devices 10 and 30.

Although the case where devices 10 and 30 are similar, for example, are two cellular phones, is assumed, all that will be described more generally applies to any system where a transponder detects an electromagnetic field radiated by a reader. In particular, all that is described applies to systems where one of the devices is dedicated to operating in reader mode and the other is dedicated to operating in card mode.

Devices 10 and 30 are capable of communicating by near field electromagnetic coupling. For a communication, one of the devices, here, device 30, operates in so-called reader mode while the other, here device 10, operates in card mode.

Device 30 comprises an RF transceiver (RF Tx/Rx) circuit block 32 comprising various electronic circuits for generating a radio frequency signal transmitted by means of an antenna.

Device 30 emits an electromagnetic field to initiate a communication with device 10. This field is captured by device 10 as soon as it is within its range. The field is detected by circuitry 12 of device 10 which are reactivated if they are at stand-by.

This translates as a variation of the load formed by the circuits of device 10 on a resonant circuit generating the field of device 30. In practice, the corresponding phase or amplitude variation of the emitted field is detected by device 30, which then starts a protocol of contactless communication with device 10.

Once device 30 has detected the presence of device 10 in its field, it starts a procedure for establishing a communication, implementing the transmission of requests by device 30 and of responses by device 10.

A message can then be transmitted to device 30 by device 10 by modulating, by means of the circuitry 12, the field emitted by device 30. The message to be transmitted is, for example, a message stored in a memory (MEMORY) 14 of device 10.

The message to be transmitted by near-field communication, for example, comprises a fixed or static portion, for example, the URL of a website or a first portion of this URL, and a variable or dynamic portion, for example, an argument of the URL or a second portion of the URL. For example, for a message to be transmitted by near-field communication having the following form: http://www.website.com/?d=12345ABC, the static portion may be the site address "http://www.website.com/" and the dynamic portion may be argument "?d=12345ABC". The argument for example contains information to be transmitted. The message transmitted from one device to the other is a message coded in ASCII (American Standard Code for Information Interchange) format. However, the dynamic portion of the message to be transmitted is conventionally in memory 14 coded in binary format.

Figure 2:
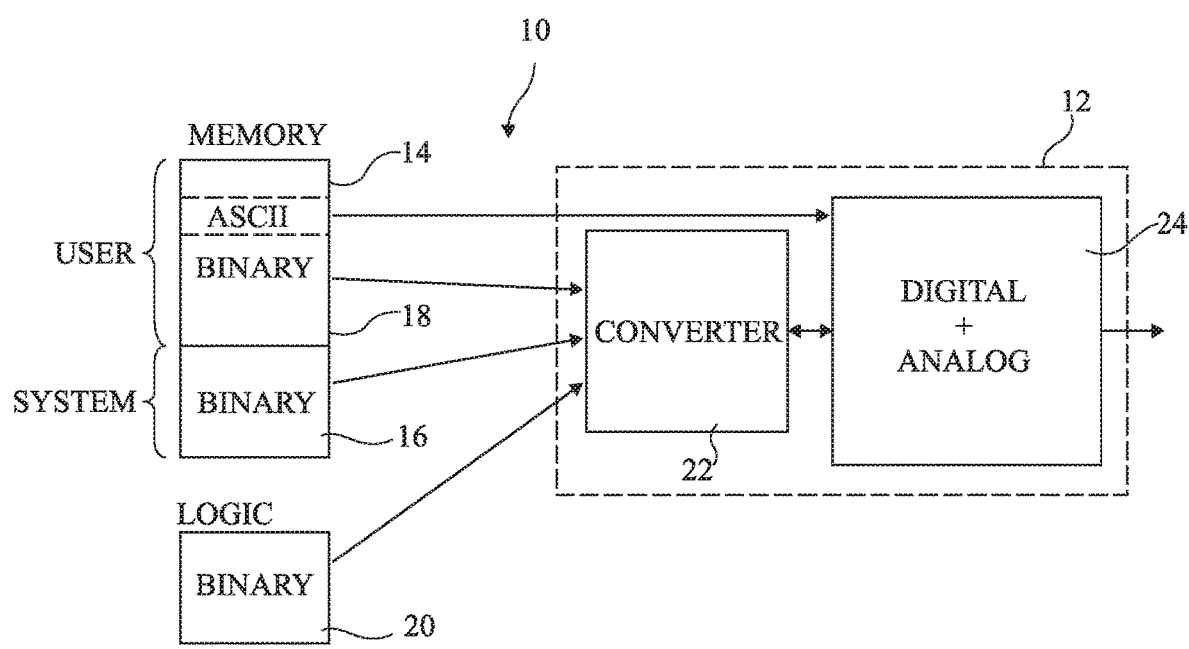
FIG. 2 shows in the form of blocks a portion of a near-field communication device.

FIG. 2 shows, in the form of the circuits 12 and 14 in further detail, the near-field communication device 10 of FIG. 1.

Device 10 comprises a memory 14 where the message to be transmitted is stored.

More specifically, the memory 14 comprises a free access area 18 (USER) which can be accessed by all users, and a restricted access area 16 (SYSTEM) containing data specific to the chip, the access to which is reserved to a restricted mode internally managed by device 10.

Device 10 may also comprise logic circuits 20 (LOGIC) which, for example, include a counter. For example, this counter is incremented each time a device in reader mode accesses the message to be transmitted.

The static portion of the message to be transmitted is stored in free access area 18 and may contain data in binary format (BINARY) or in ASCII format. The dynamic portion of the message to be transmitted is, for example, contained in restricted access area 16. The dynamic portion of the message to be transmitted can thus be modified by all the components of the device.

The data supplied by logic circuits 20 may be stored in area 16 and may thus be included in the dynamic portion of the message stored in memory 14. These data may also be directly transmitted to the circuits of block 12 without being stored in the memory.

Memory 14 mainly comprises data coded in binary format. More particularly, the dynamic portion of the message to be transmitted located in area 16 is stored in binary format. Further, the data supplied by logic circuits 20 are also supplied, and possibly stored, in binary format.

The different portions of the message, that is, the static portion, the dynamic portion, and possibly the elements directly originating from logic circuits 20, are transmitted to a converter (CONVERTER) 22 of circuit 12 which converts, for each transmission, the dynamic portion of the message and the data supplied by logic circuits 20 in ASCII format. The different portions of the message are, for example, then concatenated to form the message to be transmitted.

The message is transmitted to a transceiver circuit (DIGITAL+ANALOG) 24 which, for example, comprises digital and analog circuits performing the message transmission.

Converter 22 generally corresponds to a conversion table, which costs memory space. Further, each conversion step causes a delay for the message transmission.

Figure 3:
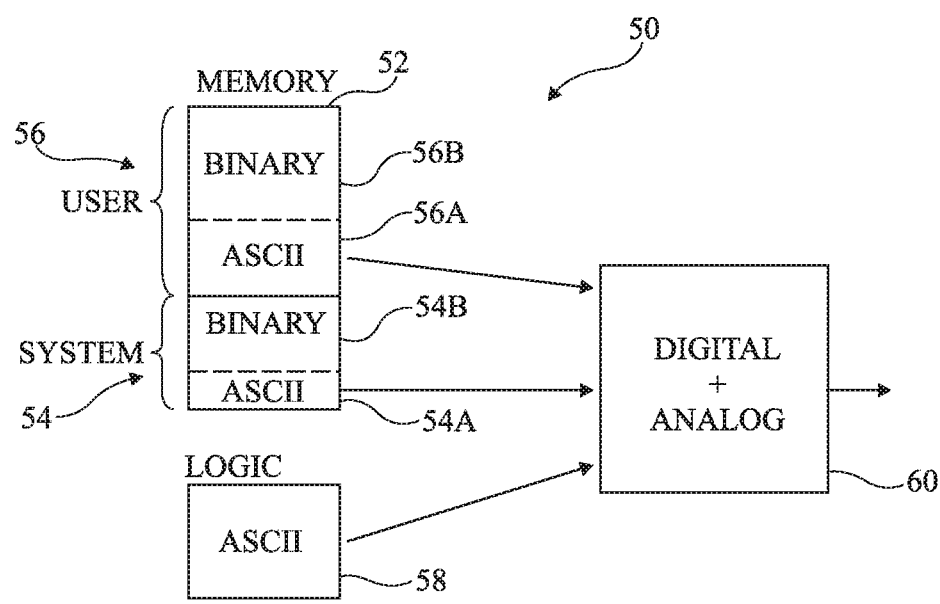
FIG. 3 shows in the form of blocks an embodiment of a portion of a near-field communication device.

FIG. 3 shows, in the form of blocks, an embodiment of a near-field communication device 50.

Device 50 comprises a memory (MEMORY) 52. Memory 52 comprises, like memory 14 of FIG. 2, a restricted access area (SYSTEM) 54 which is only accessible to the restricted mode, and a free access area (USER) 56 which can be accessed by all users. Memory 52 may be a non-volatile memory having areas 54 and 56 located therein. Memory 52 may also comprise a non-volatile memory having area 54 located therein and a volatile memory having all or part of area 56 located therein.

Areas 54 and 56 each comprise an auxiliary portion 54A or 56A. Portion 56A of area 56, for example, contains the static portion of the message to be transmitted. Portion 54A of area 54, for example, contains the dynamic portion of the message.

According to the described embodiments, auxiliary portions 54A and 56A only contain data coded in ASCII format. The message is thus stored in ASCII format in memory 52.

Areas 54 and 56 also each comprise an auxiliary portion 54B or 56B corresponding to the rest of area 54 or 46. Portions 54B and 56B are mainly in a format other than ASCII, for example, in binary format (BINARY).

Portion 54A corresponds to less than 10% of the size of memory 52.

Device 50 also comprises logic circuits (LOGIC) 58, for example including a counter incremented each time a device in reader mode accesses the transmitted message. Circuits 58 are wired to directly supply data in ASCII. The data manipulated and supplied by circuit 58 are thus in ASCII. For example, the counter is incremented in ASCII. The data in ASCII supplied by logic circuits 58 may be stored in auxiliary portion 54A or be directly transmitted to a block (DIGITAL+ANALOG) 60 comprising digital and analog circuits enabling to transmit the message.

For same data, the ASCII storage space is twice greater than the binary storage space. The message to be transmitted, for example, corresponds to 28 bits in binary format and to 56 bits in ASCII. Now, memory 52, for example, comprises 1 kilobit or 2 kilobits of space. The increase of the space dedicated to the dynamic portion of the message is thus negligible over the entire memory as compared with the time gain advantageously provided by the absence of a conversion step for each transmission of the message.

Further, the suppression of the conversion step enables to decrease the power dedicated to the transmission. It is then not necessary to supply power to the converter.

Specific embodiments have been described. Various alterations, modifications, and improvements will occur to those skilled in the art. In particular, areas 54B and 56B may contain data coded in another language than the binary format, for example, in hexadecimal language.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

The invention claimed is:

1. A near-field communication device, comprising:
   a counter circuit configured to directly supply counter circuit incremented data in an ASCII format;
   a memory coupled to receive the directly supplied counter circuit incremented data from the counter circuit and store a message in the ASCII format which includes said directly supplied counter circuit incremented data from the counter circuit; and
   a transceiver configured to retrieve the ASCII formatted message from the memory and radio frequency transmit the retrieved ASCII formatted message by near-field communications techniques in the ASCII format.

2. The device of claim 1, wherein the message comprises a static portion and a dynamic portion.

3. The device of claim 2, wherein the memory stores the dynamic portion in a restricted access area of the memory.

4. The device of claim 2, wherein the memory stores the static portion in a free access area of the memory.

5. The device of claim 2, wherein the static portion comprises an address of a web site.

6. The device of claim 2, wherein the counter circuit incremented data directly supplied by the counter circuit forms the dynamic portion.

7. The device of claim 1, wherein the memory comprises a first portion storing the variable portion of said message in ASCII format, the first portion representing less than 10% of the memory size.

8. The device of claim 7, wherein the memory comprises a second portion storing data coded in hexadecimal language.

9. A method for near-field communication, comprising:
   incrementing a count in ASCII format;
   storing a message in the ASCII format which includes the incremented count in ASCII format;
   retrieving the ASCII formatted message from the memory; and
   radio frequency transmitting of the retrieved ASCII formatted message by near-field communication techniques in the ASCII format.

10. The method of claim 9, wherein the message comprises a static portion and a dynamic portion.

11. The method of claim 10, further comprising storing the dynamic portion in a restricted access area of a memory.

12. The method of claim 10, further comprising storing the static portion in a free access area of a memory.

13. The method of claim 10, wherein the static portion comprises an address of a website.

14. The method of claim 10, wherein the incremented count is the dynamic portion.

\* \* \* \* \*